United States Patent Office 2,714,598
Patented Aug. 2, 1955

2,714,598

1-HYDROXY-2-CYANO-4-SUBSTITUTED ANILINO-ANTHRAQUINONE COMPOUNDS

George J. Taylor and Joseph B. Dickey, Kingsport, Tenn., assignors to Eastman Kodak Company, Rochester, N. Y., a corporation of New Jersey No Drawing. Application April 14, 1951,
Serial No. 221,123

6 Claims. (Cl. 260—380)

This invention relates to new anthraquinone compounds and their application to the art of dyeing or coloring.

We have discovered that the new anthraquinone compounds having the general formula:

I

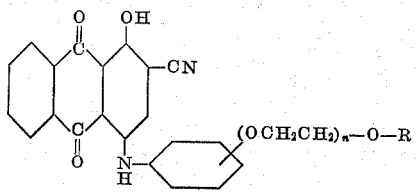

wherein R represents a hydrogen atom, a methyl group or an ethyl group, $n$ represents three or four and wherein the —(OCH$_2$CH$_2$)$_n$—O—R group is attached to the anilino radical shown in an ortho or para position to the amino group of the anilino radical are valuable dyes for coloring textile materials made of or containing a cellulose alkyl carboxylic acid ester having two to four carbon atoms in the acid groups thereof. These compounds when applied to the aforesaid materials give blue dyeings which have unusually good light and gas fastness properties. They are particularly of use for the coloration of cellulose acetate textile materials.

The dyeings obtained on cellulose acetate textile materials with the new compounds of our invention are appreciably faster to gas than those obtained with the corresponding compounds containing an amino (—NH$_2$) group in the 1-position of the anthroquinone nucleus rather than a hydroxy group.

It is an object of our invention to provide new anthraquinone compounds. Another object is to provide a satisfactory process for the preparation of the new anthraquinone compounds. A further object is to provide dyed cellulose alkyl carboxylic acid ester textile materials which possess unusually good fastness to light and gas. A particular object is to provide new anthraquinone compounds which are of especial value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The anthraquinone compounds of our invention are prepared by reacting a compound having the formula:

II

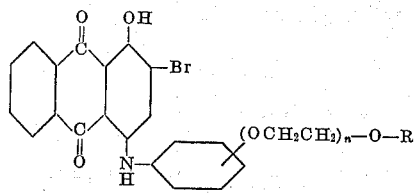

wherein R represents a hydrogen atom, a methyl group or an ethyl group, $n$ represents three or four and wherein the —(OCH$_2$CH$_2$)$_n$—O—R group is attached to the anilino radical shown in an ortho or para position to the amino group of the anilino radical with cuprous cyanide to effect replacement of the bromine atom shown by a cyano group. The reaction is conveniently carried out in the presence of an inert solvent such as quinoline.

As understood by those skilled in the art the dye compounds obtained in accordance with the procedure described herein can be purified by crystallization from a solvent therefor. N-butyl alcohol is a suitable solvent although xylene, acetic acid, toluene, o-dichlorobenzene, pyridine or ethyl alcohol, for example, can be used.

The compounds of the invention are solids, usually pasty solids, which have no melting points. Thus 1-hydroxy-2-cyano-4-p-($\beta$-hydroxy-$\beta$-ethoxy-$\beta$-ethoxyethoxy)-anilino-anthraquinone, the preparation of which is described in Example 1, is a solid which shrinks at about 92° C., softens at about 98° C. and decomposes at about 102° C.–105° C.

The following examples illustrate the compounds of our invention and the manner in which they can be prepared.

Example 1

80 grams of 1-hydroxy-2-bromo-4-p-($\beta$-hydroxy-$\beta$-ethoxy-$\beta$-ethoxyethoxy)anilino-anthraquinone and 15 grams of cuprous cyanide were placed in 640 cc. of dry quinoline and heated with stirring during 30 minutes to 200° C. Heating at 200° C. with stirring was continued until there was no further color change. (This required approximately 75 minutes.) The reaction mixture was then cooled to 40° C. and poured into 2.5 liters of 7% aqueous hydrochloric acid, heated at 65° C. for 1 hour and allowed to cool to 20° C. overnight. Then the reaction mixture was poured into 9 liters of water and the resulting mixture was allowed to stand until the dye had settled out. Most of the water was removed by decantation and the dye was washed with 4-liter portions of water several times, the water being removed by decantation after each washing. The reaction mixture was then filtered and the dye recovered on the filter was washed well with water and dried at 45° C. The dye compound thus obtained is 1-hydroxy-2-cyano-4-p-($\beta$-hydroxy-$\beta$-ethoxy-$\beta$-ethoxyethoxy)anilino-anthraquinone. If desired it can be obtained in purer form by crystallization from n-butyl alcohol.

Example 2

By the use of 80 grams of 1-hydroxy-2-bromo-4-p-($\beta$-hydroxy-$\beta$-ethoxy-$\beta$-ethoxy-$\beta$-ethoxyethoxy)anilino-anthraquinone in place of 1-hydroxy-2-bromo-4-p-($\beta$-hydroxy-$\beta$-ethoxy-$\beta$-ethoxyethoxy)anilino-anthraquinone p-($\beta$-hydroxy-$\beta$-ethoxy-$\beta$-ethoxy-$\beta$-ethoxyethoxy)anilino-anthraquinone was obtained.

Example 3

By the use of 80 grams of 1-hydroxy-2-bromo-4-o-($\beta$-hydroxy-$\beta$-ethoxy-$\beta$-ethoxyethoxy)anilino-anthraquinone in place of 1-hydroxy-2-bromo-4-p-($\beta$-hydroxy-$\beta$-ethoxy-$\beta$-ethoxyethoxy)anilino-anthraquinone in Example 1 the dye compound 1-hydroxy-2-cyano-4-o-($\beta$-hydroxy-$\beta$-ethoxy-$\beta$-ethoxyethoxy)anilino-anthraquinone was obtained.

Example 4

80 grams of 1-hydroxy-2-bromo-4-o-($\beta$-hydroxy-$\beta$-ethoxy-$\beta$-ethoxy-$\beta$-ethoxyethoxy)anilino-anthraquinone were reacted with 15 grams of cuprous cyanide in the presence of 600 cc. of dry quinoline in accordance with the procedure described in Example 1. The dye compound 1-hydroxy-2-cyano-4-o-($\beta$-hydroxy- β - ethoxy - β - ethoxy - β - ethoxyethoxy) anilino - anthraquinone was thus obtained.

*Example 5*

80 grams of 1-hydroxy-2-bromo-4-p-(β-methoxy-β-ethoxy - β - ethoxyethoxy) anilino - anthraquinone were reacted with 15 grams of cuprous cyanide in the presence of 600 cc. of dry quinoline in accordance with the procedure described in Example 1. The dye compound-1-hydroxy - 2 - cyano - 4 - p - (β - methoxy - β - ethoxy - β-ethoxyethoxy) anilino-anthraquinone was thus obtained.

*Example 6*

80 grams of 1-hydroxy-2-bromo-4-o-(β-methoxy-β-ethoxy - β - ethoxy - β - ethoxyethoxy) anilino - anthraquinone were reacted with 15 grams of cuprous cyanide in the presence of 600 cc. of dry quinoline in accordance with the procedure described in Example 1. The compound 1 - hydroxy - 2 - cyano - 4 - o - (β - methoxy - β - ethoxy - β - ethoxy - β - ethoxyethoxy) anilino - anthraquinone was thus obtained.

*Example 7*

80 grams of 1-hydroxy-2-bromo-4-p-(β-ethoxy-β-ethoxy - β - ethoxy - β - ethoxyethoxy) anilino - anthraquinone were reacted with 15 grams of cuprous cyanide in the presence of 600 cc. of dry quinoline in accordance with the procedure described in Example 1. The compound 1 - hydroxy - 2 - cyano - 4 - p - (β - ethoxy - β - ethoxy - β - ethoxy - β - ethoxyethoxy) anilino - anthraquinone was thus obtained.

Following the procedure described hereinbefore 1-hydroxy - 2 - cyano - 4 - o - (β - methoxy - β - ethoxy - β - ethoxyethoxy) anilino - anthraquinone, 1 - hydroxy - 2 - cyano - 4 - o - (β - ethoxy - β - ethoxy - β - ethoxy - β - ethoxyethoxy) anilino - anthraquinone, 1 - hydroxy - 2 - cyano - 4 - o - (β - ethoxy - β - ethoxy - β - ethoxyethoxy)-anilino - anthraquinone, 1 - hydroxy - 2 - cyano - 4 - p - (β-ethoxy - β - ethoxy - β - ethoxyethoxy) anilino - anthraquinone and 1 - hydroxy - 2 - cyano - 4 - p - (β - methoxy - β - ethoxy - β ethoxy - β - ethoxyethoxy) anilino-anthraquinone are readily prepared.

The anthraquinone compounds having the formula numbered II are prepared by reacting 1-hydroxy-2,4-dibromoanthraquinone with a primary arylamine having the general formula:

III 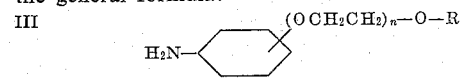

wherein R and *n* have the meaning previously assigned to them and the —(OCH₂CH₂)ₙ—O—R group is in the ortho or para position to the amino group.

The following examples illustrate the preparation of the anthraquinone compounds having the formula numbered II.

*Example 8*

45 grams of 1-hydroxy-2,4-dibromoanthraquinone, 36 grams of p-aminophenyltriglycol ether

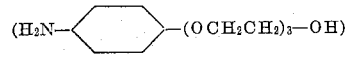

13.5 grams of potassium acetate, 1.35 grams of cupric sulfate (CuSO₄) and 225 cc. of n-amyl alcohol were refluxed together with stirring for 5½ hours. The reaction mixture was then filtered while hot and the filtrate was allowed to cool to room temperature over night. The reaction product which precipitated was collected on a filter, redispersed in about 400 cc. of n-butyl alcohol and again collected on a filter and dried at 45° C. 48 grams of 1 - hydroxy - 2 - bromo - 4 - p - (β - hydroxy - β - ethoxy - β - ethoxyethoxy) anilino - anthraquinone were thus obtained.

*Example 9*

5 grams of 1-hydroxy-2,4-dibromoanthraquinone, 4 grams of o-aminophenyltriglycol ether, 1.5 grams of po-tassium acetate, 0.15 gram of cupric sulfate and 25 cc. of n-amyl alcohol were refluxed together with stirring for 24 hours. The reaction mixture was filtered while hot and the filtrate was allowed to cool to room temperature. The reaction product separated as a blue solid and was collected on a filter, washed with a little n-butyl alcohol and dried at 45° C. 4.0 grams of 1-hydroxy-2-bromo-4-o-(β - hydroxy - β - ethoxy - β - ethoxyethoxy) anilino - anthraquinone were thus obtained. Upon recrystallization from 30 cc. of n-butyl alcohol 2.3 grams of purified product were obtained.

Compounds having the formula numbered III are prepared, for example, in accordance with the procedure described in Dickey and Byers U. S. Patent 2,391,011 issued December 18, 1945. Thus p-(β-methoxy-β-ethoxy-β-ethoxy-β-ethoxyethoxy) aniline is prepared by reacting the sodium alcoholate of H(OCH₂CH₂)₄—OCH₃ (B. P. 128° C.–130° C./0.7 mm.) with para chloronitrobenzene and then reducing the resulting nitro compound to the desired compound. Both reactions are carried out in accordance with the procedure described in said U. S. Patent 2,391,011. Similarly p-(β-ethoxy-β-ethoxy-β-ethoxy-β-ethoxyethoxy) aniline is prepared by reacting the sodium alcoholate of H(OCH₂CH₂)₄—OC₂H₅ (B. P. 141° C.–143° C./1 mm.) with para chloronitrobenzene and then reducing the resulting nitro compound to the desired compound.

H(OCH₂CH₂)₄—OC₂H₅ is prepared as described hereinafter. 1 gram mole of sodium in small pieces are added carefully to a gently heated mixture of 1 gram mole of H(OC₂H₄)₃—OC₂H₅ in 4 gram moles of ethylene glycol diethyl ether or xylene as a solvent. After all the sodium has reacted 1 gram mole of HOCH₂CH₂Cl is added dropwise to the reaction mixture while gently refluxing and after the addition is complete, refluxing is continued for two to three hours. The reaction mixture is then cooled and filtered and the solvent is removed from the filtrate by distillation under somewhat reduced pressure to obtain H(OCH₂CH₂)₄—OC₂H₅ as a viscous oil.

The new anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The anthraquinone compounds having the general formula:

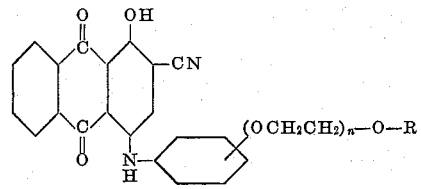

wherein R represents a member selected from the group consisting of a hydrogen atom, a methyl group and an ethyl group, $n$ represents a number selected from three and four and wherein the —$(OCH_2CH_2)_n$—O—R group is attached to the anilino radical shown in a position selected from the ortho and para positions to the amino group of the anilino radical.

2. 1-hydroxy-2-cyano - 4 - p - ($\beta$ - hydroxy - $\beta$ - ethoxy-$\beta$-ethoxyethoxy) anilino-anthraquinone.

3. 1-hydroxy - 2 - cyano -4-p- ($\beta$- hydroxy -$\beta$- ethoxy-$\beta$-ethoxy-$\beta$-ethoxyethoxy) anilino-anthraquinone.

4. 1-hydroxy - 2 - cyano - 4 -o- ($\beta$-hydroxy - $\beta$ - ethoxy-$\beta$-ethoxyethoxy) anilino-anthraquinone.

5. 1-hydroxy - 2 - cyano -4-o- ($\beta$ - hydroxy - $\beta$ - ethoxy-$\beta$-ethoxy-$\beta$-ethoxyethoxy) anilino-anthraquinone.

6. 1-hydroxy - 2 - cyano -4-p-($\beta$- methoxy - $\beta$ - ethoxy-$\beta$-ethoxyethoxy) anilino-anthraquinone.

References Cited in the file of this patent

UNITED STATES PATENTS

| | | |
|---|---|---|
| 2,391,011 | Dickey et al. | Dec. 18, 1945 |
| 2,510,088 | Dickey et al. | June 6, 1950 |

FOREIGN PATENTS

| | | |
|---|---|---|
| 306,963 | Great Britain | May 27, 1935 |

OTHER REFERENCES

Watson: Colour in Relation to Chemical Constitution, pages 2 and 3, Longmans Green & Co., London (1918).